(12) United States Patent
Song et al.

(10) Patent No.: US 8,414,022 B2
(45) Date of Patent: Apr. 9, 2013

(54) MUSHROOM AIRBAG

(75) Inventors: Seung-Jae Song, Novi, MI (US); Jong Seop Nam, Commerce Township, MI (US)

(73) Assignee: CIS Tech, LLC, Novi, MI (US)

( * ) Notice: Subject to any disclaimer, the term of this patent is extended or adjusted under 35 U.S.C. 154(b) by 177 days.

(21) Appl. No.: 12/964,856

(22) Filed: Dec. 10, 2010

(65) Prior Publication Data

US 2011/0140398 A1    Jun. 16, 2011

Related U.S. Application Data

(60) Provisional application No. 61/285,376, filed on Dec. 10, 2009, provisional application No. 61/316,625, filed on Mar. 23, 2010.

(51) Int. Cl.
*B60R 21/205* (2006.01)
*B60R 21/231* (2006.01)

(52) U.S. Cl.
USPC .................. 280/732; 280/743.2; 280/729

(58) Field of Classification Search .............. 280/732, 280/729, 743.2
See application file for complete search history.

(56) References Cited

U.S. PATENT DOCUMENTS

| 4,169,613 | A | 10/1979 | Barnett |
| 5,282,646 | A * | 2/1994 | Melvin et al. ............... 280/729 |
| 5,306,043 | A | 4/1994 | Mihm et al. |
| 5,310,214 | A | 5/1994 | Cuevas |
| 5,513,877 | A | 5/1996 | MacBrien et al. |
| 5,570,905 | A | 11/1996 | Dyer |
| 6,276,716 | B1 * | 8/2001 | Kato ............................ 280/735 |
| 7,134,691 | B2 | 11/2006 | Dunkle et al. |
| 7,441,805 | B2 | 10/2008 | Jamison et al. |
| 8,215,665 | B2 * | 7/2012 | Ohara et al. ................ 280/729 |
| 2003/0030254 | A1 | 2/2003 | Hasebe |
| 2003/0034638 | A1 | 2/2003 | Yoshida |
| 2003/0034639 | A1 | 2/2003 | Amamori |
| 2005/0161918 | A1 * | 7/2005 | Bito ............................. 280/732 |
| 2007/0108753 | A1 | 5/2007 | Pang et al. |
| 2007/0257473 | A1 * | 11/2007 | Choi ............................ 280/735 |
| 2007/0290489 | A1 | 12/2007 | Aranzulla et al. |
| 2008/0054602 | A1 | 3/2008 | Yang |
| 2009/0152846 | A1 * | 6/2009 | Choi ............................ 280/729 |
| 2009/0302587 | A1 | 12/2009 | Thomas |
| 2010/0045006 | A1 * | 2/2010 | Thomas ....................... 280/732 |
| 2010/0225095 | A1 * | 9/2010 | Smith et al. ................. 280/729 |

FOREIGN PATENT DOCUMENTS

JP    2005-329749 A  * 12/2005
KR    1020090026964     3/2009

\* cited by examiner

*Primary Examiner* — Ruth Ilan
(74) *Attorney, Agent, or Firm* — Gifford, Krass, Sprinkle, Anderson & Citkowski, P.C.; Douglas L. Wathen

(57) ABSTRACT

A passenger airbag system includes an airbag cushion with an upper airbag chamber and a lower airbag chamber. The front face of the lower airbag chamber has an upper edge joined to the lower face of the upper airbag chamber at a connection region. An upper airbag chamber length is defined as a horizontal distance between the portion of the front face of the upper airbag chamber closest to the passenger and the portion of the mid portion of the instrument panel closest to the passenger. A lower airbag chamber front offset is defined as a horizontal distance between the portion of the front face of the upper airbag chamber closest to the passenger and the connection region. The lower airbag chamber front offset is at least 25% of the upper airbag chamber length.

26 Claims, 5 Drawing Sheets

MUSHROOM AIRBAG

REFERENCE TO RELATED APPLICATIONS

This application claims priority of U.S. provisional patent applications Ser. No. 61/285,376 filed Dec. 10, 2009 and Ser. No. 61/316,625 filed Mar. 23, 2010, which are incorporated herein by reference.

FIELD OF THE INVENTION

This invention relates to a passenger side airbag system for use with a motor vehicle, wherein the airbag cushion has a mushroom shape in such a way to effectively reduce airbag volume, inflator output, cost, and weight while improving the occupant protection.

BACKGROUND OF THE INVENTION

Passenger side airbag systems are well known. However, currently available designs have various limitations and there remains a need for improved passenger side airbag systems.

SUMMARY OF THE INVENTION

The present invention provides several designs for improved passenger side airbag systems. Some embodiments of the present invention provide a passenger airbag system designed for an automotive vehicle having a passenger compartment, a windshield, and an instrument panel disposed between the passenger compartment and the windshield. The instrument panel has a top portion adjacent the windshield with a surface generally facing the windshield and a mid portion further away from the windshield with a surface generally facing a passenger. The airbag system includes an airbag housing having a folded airbag cushion disposed therein when the airbag cushion is in a non-deployed configuration. The airbag cushion is deployable from the airbag housing through the instrument panel. The airbag cushion has an upper airbag chamber and a lower airbag chamber. The upper airbag chamber is a main airbag chamber and has a substantially larger volume that the lower airbag chamber. The lower airbag chamber is a supporting airbag chamber. The upper airbag chamber has a front face facing the passenger and a lower face directed downwardly. The lower airbag chamber has a front face facing the passenger, a lower face directed downwardly, and a rear face directed toward the mid portion of the instrument panel.

According to a certain embodiments, the front face of the lower airbag chamber has an upper edge joined to the lower face of the upper airbag chamber at a connection region such that the front face of the lower airbag chamber extends downwardly from the lower face of the upper airbag chamber. An upper airbag chamber length is defined as a horizontal distance between the portion of the front face of the upper airbag chamber closest to the passenger and the portion of the mid portion of the instrument panel closest to the passenger. A lower airbag chamber front offset is defined as a horizontal distance between the portion of the front face of the upper airbag chamber closest to the passenger and the connection region where the front face of the lower airbag chamber joins the lower face of the upper airbag chamber.

According to a first embodiment, the lower airbag chamber front offset is at least 25% of the upper airbag chamber length. In some versions, the airbag system further includes a tether having a rear end attached at or near the airbag housing and a front end attached at the connection region. When the airbag cushion is inflated, a tension in the tether restraining the connection region resists the lower airbag chamber being bulged toward the passenger at the connection region and the rear face of the lower airbag chamber pushes against the mid portion of the instrument panel. This causes the lower airbag chamber to generate a torque and a lifting force to the upper airbag chamber. In some versions, the airbag housing has an upper part and a lower part and the rear end of the tether is attached to the upper part of the airbag housing. This causes gas from the airbag housing to be encouraged to flow first into the lower airbag chamber and then into the upper airbag chamber.

In certain versions, the system further includes a tether having a rear end attached at the airbag housing and a front end attached at the front face of the upper chamber. The airbag housing has an upper part and a lower part and the rear end of the tether may be attached to the upper part of the airbag housing. This causes gas from the airbag housing to be encouraged to flow first into the lower airbag chamber and then into the upper airbag chamber.

In some embodiments, the airbag cushion has a design configuration defined as the shape of the airbag cushion if inflated while not in contact with the mid portion of the instrument panel. The airbag further has an actual inflated configuration defined as the shape of the airbag when inflated and in contact with the mid portion of the instrument panel. A lower airbag chamber rear offset is defined as a horizontal distance between the rear face of the lower airbag chamber with the airbag cushion in the design configuration and the mid portion of the instrument panel closest to the passenger.

In certain embodiments, the lower airbag chamber rear offset is greater than 25 millimeters such that the mid portion of the instrument panel causes the rear face of the lower airbag chamber to be distorted to a position closer to the passenger when the airbag is in the actual inflated configuration than if the airbag cushion were in the design configuration.

In further embodiments, the front face of the lower airbag chamber extends generally vertically downwardly from the connection region when the airbag is in the design configuration. In some versions, the lower airbag chamber front offset is at least 33% of the upper airbag chamber length. In further versions, the lower airbag chamber front offset is at least 50% of the upper airbag chamber length.

In some versions of the present invention, the front face of the lower airbag chamber with the airbag cushion in the design configuration is offset rearwardly from the front face of the upper airbag chamber by a distance equal to at least 25% of the upper airbag chamber length. In some versions, the rearward offset is at least 50% of the upper airbag chamber length.

The lower airbag chamber has a geometric center. A lower airbag chamber geometric offset is defined as the horizontal distance between the position of the geometric center if the airbag cushion is in the design configuration and the portion of the mid portion of the instrument panel closest to the passenger. In some embodiments, the geometric offset is in the range of 0 to 33% of the upper airbag chamber length.

In some versions, the upper airbag chamber has a volume at least twice as large as the lower airbag chamber and in some other versions it has a volume at least three times as large. According to a second embodiment of the present invention, the lower airbag chamber has a front face slanted toward the mid portion of the instrument panel, a lower face directed downwardly, and a rear face directed toward the mid portion of the instrument panel. The front face of the lower airbag chamber has an upper edge joined to the upper airbag chamber at a connection region such that the front face of the lower airbag chamber extends downwardly and rearwardly from the upper airbag chamber. An upper airbag chamber length is defined as a horizontal distance between the portion of the front face of the upper airbag cushion closest to the passenger and the portion of the mid portion of the instrument panel closest to the passenger. The airbag cushion has a design configuration defined as the shape of the airbag cushion if inflated while not in contact with the mid portion of the instrument panel and an actual inflated configuration defined as the shape of the airbag when inflated and in contact with the mid portion of the instrument panel. A lower airbag chamber rear offset is defined as a horizontal distance between the rear face of the lower airbag chamber with the airbag cushion in the design configuration and the mid portion of the instrument panel closest to the passenger. The lower airbag chamber rear offset is greater than 25 millimeters such that when the mid portion of the instrument panel causes the rear face of the lower airbag chamber to be distorted to a position closer to the passenger when the airbag is in the actual inflated configuration than if the airbag cushion were in the design configuration. The lower airbag chamber has a geometric center. A lower airbag chamber geometric offset is defined as the horizontal distance between the position of the geometric center if the airbag cushion is in the design configuration and the portion of the mid portion of the instrument panel closest to the passenger, the geometric offset being in the range of 0 to 33% of the upper airbag chamber length.

In some versions, the system further comprises a tether having a rear end attached at or near the airbag housing and a front end attached at the connection region. When the airbag cushion is inflated, a tension in the tether restraining the connection region resists the lower airbag chamber being bulged toward the passenger at the connection region and the rear face of the lower airbag chamber pushes against the mid portion of the instrument panel, thereby causing the lower airbag chamber to generate a torque and a lifting force to the upper airbag chamber.

The airbag housing has an upper part and a lower part and the rear end of the tether may be attached to the upper part of the airbag housing such that gas from the airbag housing is encouraged to flow first into the lower airbag chamber and then into the upper airbag chamber.

In some embodiments, the system includes a tether with a rear end attached at the airbag housing and a front end attached at the front face of the upper chamber. In some versions, the rear end of the tether is attached to the upper part of the airbag housing such that gas from the airbag housing is encouraged to flow first into the lower airbag chamber and then into the upper airbag chamber.

The present invention further includes combinations of the above embodiments.

DETAILED DESCRIPTION OF THE DRAWINGS

The present invention provides a variety of embodiments of improved airbag system designs. For purposes of definition, the front of an airbag is directed toward a passenger and the rear is directed away from the passenger. Therefore, the front of an airbag faces the rear of the vehicle.

Figure 1:
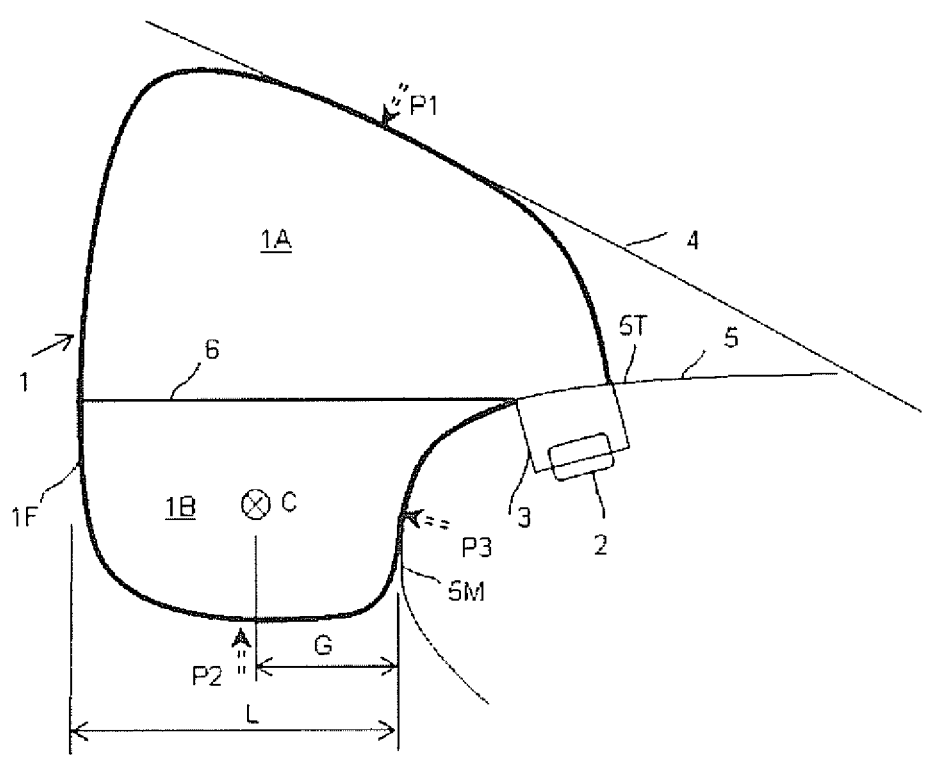
FIG. 1 shows a traditional passenger airbag system commonly used in today's vehicles.

FIG. 1 shows a traditional passenger airbag system comprised of an airbag cushion 1, an airbag housing 3, and a gas generating inflator 2. The instrument panel 5 has a top portion 5T with a surface generally facing a windshield 4 and a mid portion 5M with a surface generally facing an occupant. The airbag cushion 1 typically has a tether 6, and may have an additional tether located above it. The tether is attached on one end to the airbag housing 3, runs substantially horizontally, and is attached on the other end to the front face of the airbag cushion 1F. For definitional purposes, the airbag may be said to have an upper airbag chamber 1A above the tether and a lower airbag chamber 1B below the tether. During airbag inflation, the airbag cushion hits the windshield 4 and gets reflected downward by a force P1 generated by a pressure on the windshield. The force P1, along with a gravity force, causes the airbag cushion to drop downward. A force P2 is generated by a pressure on the occupant's femurs and a force P3 is generated by a pressure on the mid portion of the instrument panel. The forces P2 and P3 counteract the downward force P1 and eventually stabilize the airbag cushion. It is notable that the distance G measured from the geometric center C of the lower airbag chamber 1B to the mid portion of the instrument panel 5M is about one half (50%) of the length L, the distance being measured between the front face 1F of the airbag cushion and the mid portion of the instrument panel 5M.

Figure 2:
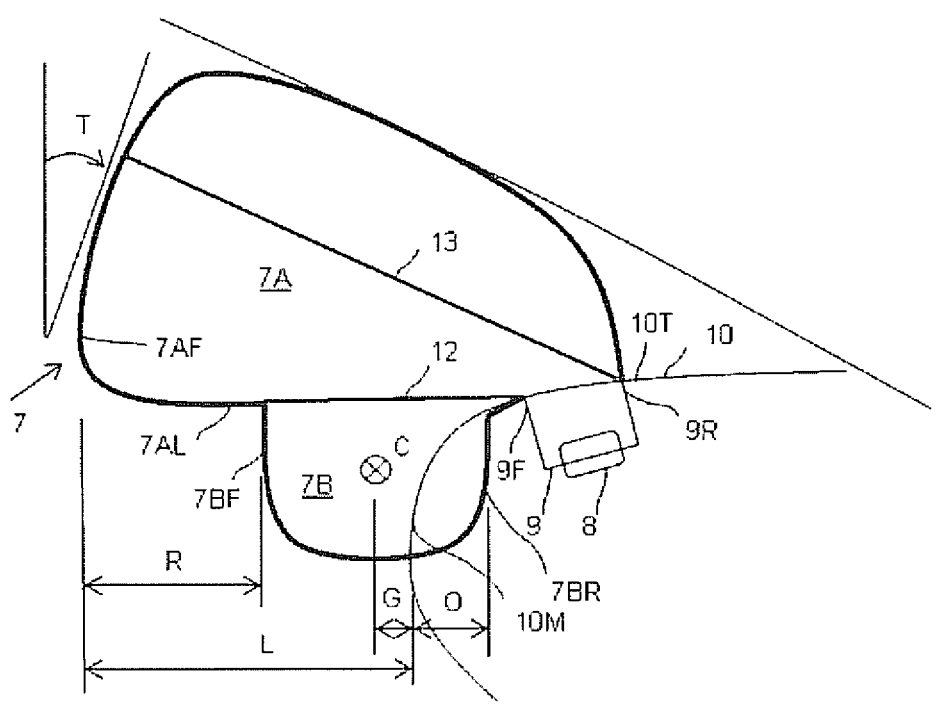
FIG. 2 shows an embodiment of the present invention in which the airbag cushion has a mushroom shape.

FIG. 2 shows an embodiment of the present invention. An airbag cushion 7 is comprised of an upper or main airbag chamber 7A located above a short lower tether 12 and a supporting lower airbag chamber 7B located below the short tether. An airbag housing 9 having a front part 9F facing a passenger and a rear part 9R facing the windshield is mounted in a top portion 10T of an instrument panel 10 with a gas generating inflator 8. The airbag housing contains the airbag cushion in a folded and un-inflated configuration. As shown, the front part 9F of the airbag housing is lower than the rear part 9R. As such, the front part 9F may also be considered a lower part and the rear part 9R may be also considered an upper part.

The upper airbag chamber 7A is similar in shape and volume to that of the traditional airbag shown in FIG. 1. The lower airbag chamber 7B, however, is much smaller than that of the traditional airbag. The front face 7BF of the lower airbag chamber 7B has an upper edge that is connected to the lower face 7AL of the upper airbag chamber 7A at a connection region 7C. As shown, the front face 7BF is substantially recessed or offset from the front face 7AF of the upper airbag chamber, by an amount R. The recess or offset R may be referred to as the lower airbag front offset, and is defined as the horizontal distance between the portion of the front face 7AF of the upper airbag chamber 7A closest to a passenger and the connection region 7C. This recessed design in the present embodiment can reduce the total airbag volume by about 20%, which can reduce the inflator output by about 30%. The reduced inflator output and airbag volume can save significant cost and weight of the airbag module while reducing the risk of injuries to out-of-position occupants during airbag inflation. This offset or recess can also reduce the neck injury of an in-position occupant by reducing the chance of neck interaction with the airbag cushion. The upper airbag chamber 7A may be said to have an upper airbag chamber length L equal to the horizontal distance between the portion of the front face 7AF of the upper airbag chamber 7A closest to the passenger and the portion of the mid portion of the instrument panel 10M closest to the passenger. The lower airbag chamber front offset or recess R should be at least one quarter (25%) of the length L. In some embodiments, the offset or recess R is preferably about one half (50%).

The short lower tether 12 has a rear end that may be attached to or near the front or lower part 9F of the airbag housing 9 and a front end that may be attached to the connection region 7C where the lower face 7AL of the upper airbag chamber 7A joins the front face 7BF of the lower airbag chamber 7B, and where the recess R starts. The short tether 12 may alternatively be attached to the rear or upper part 9R of the airbag housing. A long upper tether 13 may have one end attached to a rear part 9R of the airbag housing 9 and opposite end attached to a front face 7AF of the upper airbag chamber 7A.

Figure 3:
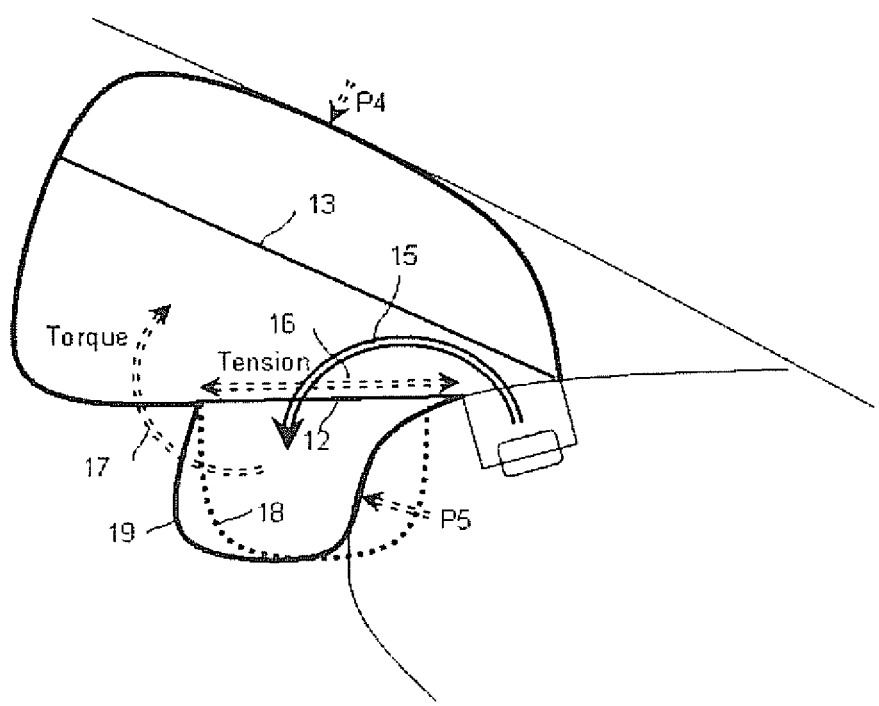
FIG. 3 illustrates how the embodiment of the present invention works.

The illustrated embodiment of the airbag cushion 7 may be said to have a design configuration corresponding to the shape of the airbag cushion if it is inflated and not in contact with the mid portion of the instrument panel and an actual inflated configuration corresponding to the shape of the airbag cushion when it is inflated and in contact with the mid portion. The airbag cushion 7 is shown in the design configuration in FIG. 2. In FIG. 3, the airbag cushion 7 is illustrated in the actual inflated configuration in solid lines. The design configuration for the lower airbag chamber is shown in dashed lines. Put another way, the design configuration is the shape of the airbag cushion if it were inflated and the mid portion of the instrument panel were not in the way. Because the mid portion is in the way in the illustrated embodiments, the airbag cushion is forced into the actual inflated configuration. It is noted that in the traditional airbag system of FIG. 1, the design and actual inflated configurations are generally the same, unlike in some embodiments of the present invention.

Referring again to FIG. 2, the lower airbag chamber has a negative offset O. This offset O may be referred to as the lower airbag chamber rear offset, and defined as the horizontal distance between the rear face 7BR of the lower airbag chamber 7B in the design configuration and the portion of the mid portion 10M of the instrument panel closest to the passenger. In some embodiments, the offset O is 25 mm or more. It is notable that the geometric center C of the lower airbag chamber, when it is in the design configuration, is much closer to the mid portion of the instrument panel than for the traditional airbag shown in FIG. 1. The distance G measured horizontally from the geometric center C to the mid portion of the instrument panel 5M, in the design configuration, preferably should be at the most one-third (33%) of the length L and more preferably about one quarter (25%) of the length L. This distance G may be referred to as a lower airbag chamber geometric offset, and be defined as the horizontal distance between the position of the geometric center C if the airbag cushion is in the design configuration and the portion of the mid portion 5M of the instrument panel closest to the passenger.

The front face 7AF of the upper airbag chamber is preferably slanted, as shown, in order to improve the neck injury in NCAP (a test protocol by U.S. government agency) tests. The angle T is preferred to range from 10 to 30 degrees.

FIG. 3 shows how some embodiments of the present invention work during airbag inflation. The lower airbag chamber shown in a dotted line 18 indicates the design configuration. The lower airbag chamber shown in a solid line 19 indicates the airbag shape after inflation, in the actual inflated configuration, The gas generated from the inflator travels upward toward the windshield. With a help of the upper tether 13 obstructing gas flow, a significant amount of gas is reflected downward and travels into the lower airbag chamber as indicated by an arrow 15. As the lower airbag chamber inflates, the mid portion of the instrument panel pushes the lower airbag chamber away from it and creates a pressure P5 with a help of the negative offset. The short tether 12 helps increase the pressure P5 by maintaining the distance between the two attachment points with a tension 16. This pressure P5 in turn creates a torque 17 which generates a lifting force toward the upper airbag chamber to prevent or reduce the airbag drop, which could have been significant otherwise due to the downward pressure P4 acting on the windshield.

Figure 4:
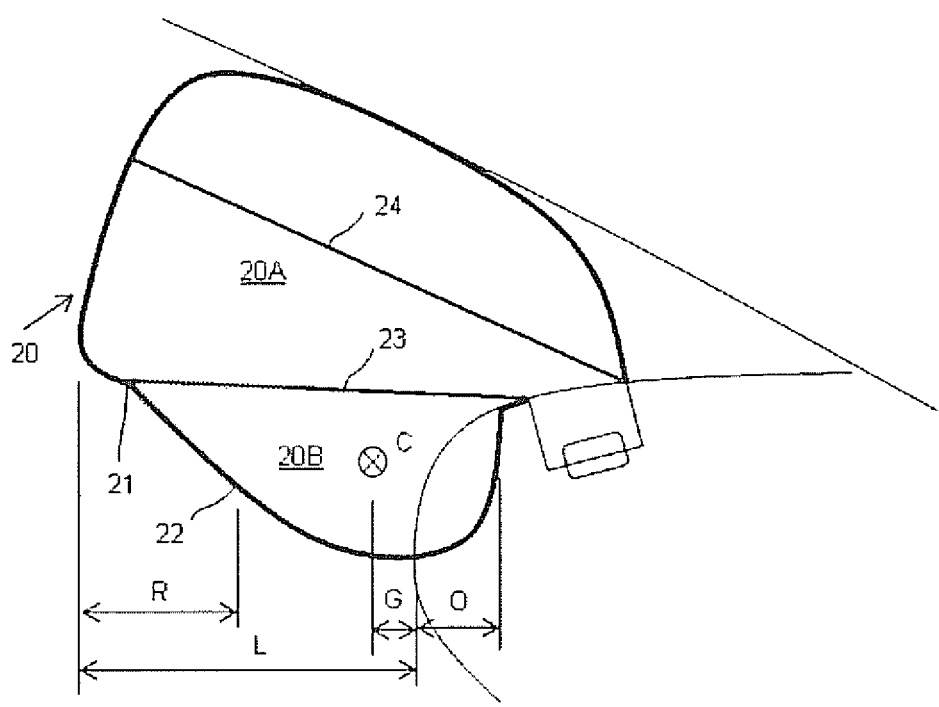
FIG. 4 shows another embodiment of the present invention in which the lower chamber of the airbag cushion is gradually recessed.

FIG. 4 shows another embodiment of the present invention in which the front face 22 of the lower airbag chamber 20B of an airbag 20 is gradually recessed from the upper airbag chamber 20A. A lower tether 23 has a front end 21 that is attached to a part of the upper airbag chamber and a rear end that is attached to or near the airbag housing. An upper tether 24 is attached in a similar manner as the one shown in FIG. 2. The lower airbag chamber 20B has a negative offset O. The offset amount O is preferred to be as large as possible while design allows, and should be at least 25 mm. For example, the offset O may be 50 mm or more in some embodiments. The lower airbag chamber geometric offset G is much smaller compared to that of the traditional airbag shown in FIG. 1. The geometric offset G should be at most one third (33%) of the upper airbag length L. The slanted front face 22 has an average recess amount R which is similar to that of the lower airbag chamber shown in FIG. 2. This embodiment has similar features and benefits to the previous one shown in FIG. 2 and FIG. 3.

Figure 5:
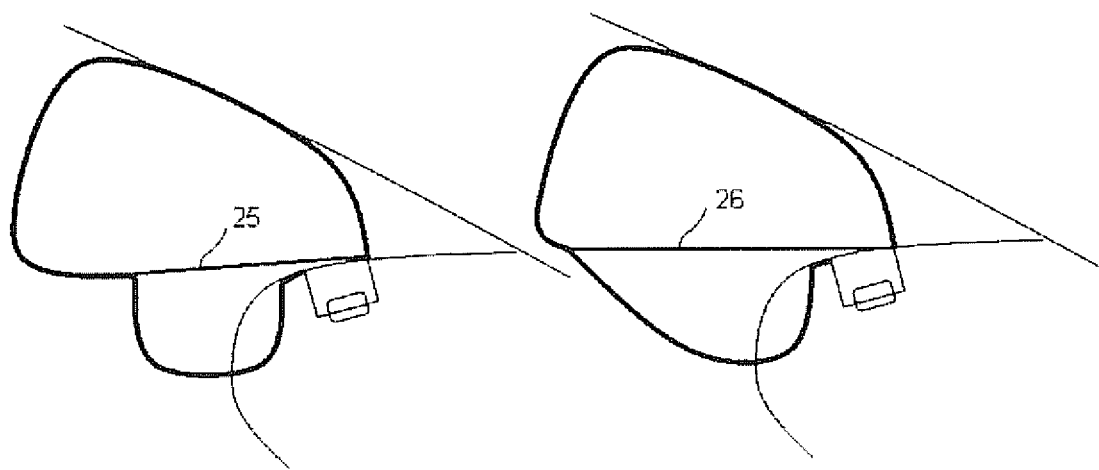
FIG. 5 shows additional embodiments of the present invention in which a tether is attached to the upper part of the airbag housing.

FIG. 5 shows additional embodiments of the present invention in which only one tether 25 or 26 has a rear end that is attached at the rear or upper part of the airbag housing and a front end that is attached at the connection region between the two chambers. The single tether may be attached to the front face of the upper airbag chamber instead of the connection region as another embodiment. The illustrated exemplary tether configuration encourages the gas to flow into the lower chamber first and then into the upper chamber so that the rear face of the lower chamber pushes the mid portion of the instrument panel harder than otherwise configured. The tether may or may not have holes to control the gas flow in such a way as to prevent the airbag cushion from dropping during inflation.

As will be clear to those of skill in the art, the herein disclosed and described embodiments of the present invention may be altered in various ways without departing from the scope or teaching of the present invention. It is the following claims, including all equivalents, which define the present invention.

We claim:

1. A passenger airbag system for an automotive vehicle having a passenger compartment, a windshield, and an instrument panel disposed between the passenger compartment and the windshield, the instrument panel having a top portion adjacent the windshield with a surface generally facing the windshield and a mid portion further away from the windshield with a surface generally facing a passenger, the passenger airbag system comprising:
   an airbag housing mounted in a top portion of the instrument panel, the airbag housing having a folded airbag cushion disposed therein when the airbag cushion is in a non-deployed configuration, the airbag cushion being deployable from the airbag housing through the instrument panel;

the airbag cushion having an upper airbag chamber and a lower airbag chamber, the upper airbag chamber being a main airbag chamber and having a substantially larger volume than the lower airbag chamber, the lower airbag chamber being a supporting airbag chamber;

a gas generating inflator operable to generate a flow of gas into both the upper and lower chambers;

the upper airbag chamber having a front face facing the passenger and a lower face directed downwardly, the lower airbag chamber having a front face facing the passenger, a lower face directed downwardly, and a rear face directed toward the mid portion of the instrument panel, the front face of the lower airbag chamber having an upper edge joined to the lower face of the upper airbag chamber at a connection region such that the front face of the lower airbag chamber extends downwardly from the lower face of the upper airbag chamber;

a tether having a rear end attached at or near the airbag housing and a front end attached to the airbag cushion;

an upper airbag chamber length being defined as a horizontal distance between the portion of the front face of the upper airbag chamber closest to the passenger and the portion of the mid portion of the instrument panel closest to the passenger; and a lower airbag chamber front offset being defined as a horizontal distance between the portion of the front face of the upper airbag chamber closest to the passenger and the connection region where the front face of the lower airbag chamber joins the lower face of the upper airbag chamber, the lower airbag chamber front offset being at least 25% of the upper airbag chamber length.

2. A passenger airbag system in accordance with claim 1, wherein:
the tether has a front end attached at or near the connection region;
the upper airbag chamber being located above the tether and the lower airbag chamber being located below the tether, gas from the gas generating inflator flowing past the tether during inflation.

3. A passenger airbag system in accordance with claim 2, wherein:
the tether is configured such that the flow of gas from the inflator is encouraged to flow into the lower chamber first and then into the upper chamber during inflation.

4. A passenger airbag system in accordance with claim 2, wherein:
the tether has holes defined therein to control the gas flow.

5. A passenger airbag system in accordance with claim 1, wherein:
the front face of the upper airbag chamber is slanted at an angle of 10 to 30 degrees with respect to vertical.

6. A passenger airbag system in accordance with claim wherein:
the front end of the tether is attached at the connection region; and
wherein when the airbag cushion is inflated;
a tension in the tether restraining the connection region resists the lower airbag chamber being bulged toward the passenger at the connection region; and
the rear face of the lower airbag chamber pushes against the mid portion of the instrument panel;
whereby the lower airbag chamber generates a torque and a lifting force to the upper airbag chamber.

7. A passenger airbag system in accordance with claim 1, wherein:
the airbag cushion has a design configuration defined as the shape of the airbag cushion if inflated while not in contact with the mid portion of the instrument panel, the airbag further having an actual inflated configuration defined as the shape of the airbag when inflated and in contact with the mid portion of the instrument panel; and
the front face of the lower airbag chamber extending generally vertically downwardly from the connection region when the airbag cushion is in the design configuration.

8. A passenger airbag system in accordance with claim 1, wherein:
the lower airbag chamber front offset is at least 33% of the upper airbag chamber length.

9. A passenger airbag system in accordance with claim 1, wherein:
the lower airbag chamber front offset is about 50% of the upper airbag chamber length.

10. A passenger airbag system in accordance with claim 1, wherein:
the airbag cushion has a design configuration defined as the shape of the airbag cushion if inflated while not in contact with the mid portion of the instrument panel, the airbag further having an actual inflated configuration defined as the shape of the airbag when inflated and in contact with the mid portion of the instrument panel;
the front face of the lower airbag chamber with the airbag cushion in the design configuration is offset rearwardly from the front face of the upper airbag chamber by a distance equal to at least 25% of the upper airbag chamber length.

11. A passenger airbag system in accordance with claim 10, wherein:
the front face of the lower airbag chamber with the airbag cushion in the design configuration is offset rearwardly from the front face of the upper airbag chamber by a distance equal to about 50% of the upper airbag chamber length.

12. A passenger airbag system in accordance with claim 1, wherein:
the upper airbag chamber has a volume at least twice as large as the volume of the lower airbag chamber.

13. A passenger airbag system in accordance with claim 1, wherein:
the upper airbag chamber has a volume at least three times as large as the volume of the lower airbag chamber.

14. A passenger airbag system for an automotive vehicle having a passenger compartment, a windshield, and an instrument panel disposed between the passenger compartment and the windshield, the instrument panel having a top portion adjacent the windshield with a surface generally facing the windshield and a mid portion further away from the windshield with a surface generally facing a passenger, the passenger airbag system comprising:
an airbag housing having a folded airbag cushion disposed therein when the airbag cushion is in a non-deployed configuration, the airbag cushion being deployable from the airbag housing through the instrument panel;
the airbag cushion having an upper airbag chamber and a lower airbag chamber, the upper airbag chamber being a main airbag chamber and having a substantially larger volume than the lower airbag chamber, the lower airbag chamber being a supporting airbag chamber;
the upper airbag chamber having a front face facing the passenger and a lower face directed downwardly, the lower airbag chamber having a front face facing the passenger, a lower face directed downwardly, and a rear face directed toward the mid portion of the instrument panel, the front face of the lower airbag chamber having an upper edge joined to the lower face of the upper airbag chamber at a connection region such that the front face of the lower airbag chamber extends downwardly from the lower face of the upper airbag chamber;

an upper airbag chamber length being defined as a horizontal distance between the portion of the front face of the upper airbag chamber closest to the passenger and the portion of the mid portion of the instrument panel closest to the passenger;

a lower airbag chamber front offset being defined as a horizontal distance between the portion of the front face of the upper airbag chamber closest to the passenger and the connection region where the front face of the lower airbag chamber joins the lower face of the upper airbag chamber, the lower airbag chamber front offset being at least 25% of the upper airbag chamber length; and a tether having a rear end attached at the airbag housing and a front end attached at the front face of the upper chamber.

15. A passenger airbag system in accordance with claim 14, wherein:
the airbag housing has an upper part and a lower part; and the rear end of the tether is attached to the upper part of the airbag housing;
whereby gas from the airbag housing is encouraged to flow first into the lower airbag chamber and then into the upper airbag chamber.

16. A passenger airbag system for an automotive vehicle having a passenger compartment, a windshield, and an instrument panel disposed between the passenger compartment and the windshield, the instrument panel having a top portion adjacent the windshield with a surface generally facing the windshield and a mid portion further away from the windshield with a surface generally facing a passenger, the passenger airbag system comprising:

an airbag housing having a folded airbag cushion disposed therein when the airbag cushion is in a non-deployed configuration, the airbag cushion being deployable from the airbag housing through the instrument panel;

the airbag cushion having an upper airbag chamber and a lower airbag chamber, the upper airbag chamber being a main airbag chamber and having a substantially larger volume than the lower airbag chamber, the lower airbag chamber being a supporting airbag chamber;

the upper airbag chamber having a front face facing the passenger and a lower face directed downwardly, the lower airbag chamber having a front face facing the passenger, a lower face directed downwardly, and a rear face directed toward the mid portion of the instrument panel, the front face of the lower airbag chamber having an upper edge joined to the lower face of the upper airbag chamber at a connection region such that the front face of the lower airbag chamber extends downwardly from the lower face of the upper airbag chamber;

an upper airbag chamber length being defined as a horizontal distance between the portion of the front face of the upper airbag chamber closest to the passenger and the portion of the mid portion of the instrument panel closest to the passenger;

a lower airbag chamber front offset being defined as a horizontal distance between the portion of the front face of the upper airbag chamber closest to the passenger and the connection region where the front face of the lower airbag chamber joins the lower face of the upper airbag chamber, the lower airbag chamber front offset being at least 25% of the upper airbag chamber length;

the airbag cushion having a design configuration defined as the shape of the airbag cushion if inflated while not in contact with the mid portion of the instrument panel, the airbag further having an actual inflated configuration defined as the shape of the airbag when inflated and in contact with the mid portion of the instrument panel;

a lower airbag chamber rear offset being defined as a horizontal distance between the rear face of the lower airbag chamber with the airbag cushion in the design configuration and the mid portion of the instrument panel closest to the passenger; and the lower airbag chamber rear offset being greater than 25 mm such that the mid portion of the instrument panel causes the rear face of the lower airbag chamber to be distorted to a position closer to the passenger when the airbag is in the actual inflated configuration than if the airbag cushion were in the design configuration.

17. A passenger airbag system in accordance with claim 16, wherein:
the lower airbag chamber rear offset is greater than 50 mm.

18. A passenger airbag system for an automotive vehicle having a passenger compartment, a windshield, and an instrument panel disposed between the passenger compartment and the windshield, the instrument panel having a top portion adjacent the windshield with a surface generally facing the windshield and a mid portion further away from the windshield with a surface generally facing a passenger, the passenger airbag system comprising:

an airbag housing having a folded airbag cushion disposed therein when the airbag cushion is in a non-deployed configuration, the airbag cushion being deployable from the airbag housing through the instrument panel;

the airbag cushion having an upper airbag chamber and a lower airbag chamber, the upper airbag chamber being a main airbag chamber and having a substantially larger volume than the lower airbag chamber, the lower airbag chamber being a supporting airbag chamber, the upper airbag chamber having a front face facing the passenger and a lower face directed downwardly, the lower airbag chamber having a front face facing the passenger, a lower face directed downwardly, and a rear face directed toward the mid portion of the instrument panel, the front face of the lower airbag chamber having an upper edge joined to the lower face of the upper airbag chamber at a connection region such that the front face of the lower airbag chamber extends downwardly from the lower face of the upper airbag chamber;

an upper airbag chamber length being defined as a horizontal distance between the portion of the front face of the upper airbag chamber closest to the passenger and the portion of the mid portion of the instrument panel closest to the passenger; and a lower airbag chamber front offset being defined as a horizontal distance between the portion of the front face of the upper airbag chamber closest to the passenger and the connection region where the front face of the lower airbag chamber joins the lower face of the upper airbag chamber, the lower airbag chamber front offset being at least 25% of the upper airbag chamber length;

the airbag cushion having a design configuration defined as the shape of the airbag cushion if inflated while not in contact with the mid portion of the instrument panel, the airbag further having an actual inflated configuration defined as the shape of the airbag when inflated and in contact with the mid portion of the instrument panel;

the lower airbag chamber having a geometric center, a lower airbag chamber geometric offset being defined as the horizontal distance between the position of the geometric center if the airbag cushion is in the design configuration and the portion of the mid portion of the instrument panel closest to the passenger, the geometric offset being in the range of 0 to 33% of the upper airbag chamber length.

19. A passenger airbag system for an automotive vehicle having a passenger compartment, a windshield, and an instrument panel disposed between the passenger compartment and the windshield, the instrument panel having a top portion adjacent the windshield with a surface generally facing the windshield and a mid portion further away from the windshield with a surface generally facing a passenger, the passenger airbag system comprising:

an airbag housing having a folded airbag cushion disposed therein when the airbag cushion is in a non-deployed configuration, the airbag cushion being deployable from the airbag housing through the instrument panel;

the airbag cushion having an upper airbag chamber and a lower airbag chamber, the upper airbag chamber being a main airbag chamber and having a substantially larger volume than the lower airbag chamber, the lower airbag chamber being a supporting airbag chamber;

the upper airbag chamber having a front face facing the passenger, the lower airbag chamber having a front face slanted toward the mid portion of the instrument panel, a lower face directed downwardly, and a rear face directed toward the mid portion of the instrument panel, the front face of the lower airbag chamber having an upper edge joined to the upper airbag chamber at a connection region such that the front face of the lower airbag chamber extends downwardly and rearwardly from the upper airbag chamber;

an upper airbag chamber length being defined as a horizontal distance between the portion of the front face of the upper airbag cushion closest to the passenger and the portion of the mid portion of the instrument panel closest to the passenger;

the airbag cushion having a design configuration defined as the shape of the airbag cushion if inflated while not in contact with the mid portion of the instrument panel, the airbag cushion further having an actual inflated configuration defined as the shape of the airbag when inflated and in contact with the mid portion of the instrument panel;

a lower airbag chamber rear offset being defined as a horizontal distance between the rear face of the lower airbag chamber with the airbag cushion in the design configuration and the mid portion of the instrument panel closest to the passenger;

the lower airbag chamber rear offset being greater than 25 mm such that the mid portion of the instrument panel causes the rear face of the lower airbag chamber to be distorted to a position closer to the passenger when the airbag is in the actual inflated configuration than if the airbag cushion were in the design configuration; and the lower airbag chamber having a geometric center, a lower airbag chamber geometric offset being defined as the horizontal distance between the position of the geometric center if the airbag cushion is in the design configuration and the portion of the mid portion of the instrument panel closest to the passenger, the geometric offset being in the range of 0 to 33% of the upper airbag chamber length.

20. A passenger airbag system in accordance with claim 19, further comprising:
a tether having a rear end attached at or near the airbag housing and a front end attached at the connection region; and
wherein when the airbag cushion is inflated;
a tension in the tether restraining the connection region resists the lower airbag chamber being bulged toward the passenger at the connection region; and
the rear face of the lower airbag chamber pushes against the mid portion of the instrument panel;
whereby the lower airbag chamber generates a torque and a lifting force to the upper airbag chamber.

21. A passenger airbag system in accordance with claim 20, wherein:
the airbag housing has an upper part and a lower part; and
the rear end of the tether is attached to the upper part of the airbag housing;
whereby gas from the airbag housing is encouraged to flow first into the lower airbag chamber and then into the upper airbag chamber.

22. A passenger airbag system in accordance with claim 19, further comprising:
a tether having a rear end attached at the airbag housing and a front end attached at the front face of the upper chamber.

23. A passenger airbag system in accordance with claim 22, wherein:
the airbag housing has an upper part and a lower part; and
the rear end of the tether is attached to the upper part of the airbag housing;
whereby gas from the airbag housing is encouraged to flow first into the lower airbag chamber and then into the upper airbag chamber.

24. A passenger airbag system in accordance with claim 19, wherein:
the lower airbag chamber rear offset is greater than 50 mm.

25. A passenger airbag system for an automotive vehicle having a passenger compartment, a windshield, and an instrument panel disposed between the passenger compartment and the windshield, the instrument panel having a top portion adjacent the windshield with a surface generally facing the windshield and a mid portion further away from the windshield with a surface generally facing a passenger, the passenger airbag system comprising:

an airbag housing having a folded airbag cushion disposed therein when the airbag cushion is in a non-deployed configuration, the airbag cushion being deployable from the airbag housing through the instrument panel;

the airbag cushion having an upper airbag chamber and a lower airbag chamber, the upper airbag chamber being a main airbag chamber and having a substantially larger volume than the lower airbag chamber, the lower airbag chamber being a supporting airbag chamber;

the upper airbag chamber having a front face facing the passenger and a lower face directed downwardly, the lower airbag chamber having a front face facing the passenger, a lower face directed downwardly, and a rear face directed toward the mid portion of the instrument panel, the front face of the lower airbag chamber having an upper edge joined to the lower face of the upper airbag chamber at a connection region such that the front face of the lower airbag chamber extends downwardly from the lower face of the upper airbag chamber;

an upper airbag chamber length being defined as a horizontal distance between the portion of the front face of the upper airbag chamber closest to the passenger compartment and the portion of the mid portion of the instrument panel closest to the passenger compartment;

a lower airbag chamber front offset being defined as a horizontal distance between the portion of the front face of the upper airbag chamber closest to the passenger compartment and the connection region where the front face of the lower airbag chamber joins the lower face of the upper airbag chamber, the lower airbag chamber front offset being at least 25% of the upper airbag chamber length;

the airbag cushion having a design configuration defined as the shape of the airbag cushion if inflated while not in contact with the mid portion of the instrument panel, the airbag further having an actual inflated configuration defined as the shape of the airbag when inflated and in contact with the mid portion of the instrument panel;

a lower airbag chamber rear offset being defined as a horizontal distance between the rear face of the lower airbag chamber with the airbag cushion in the design configuration and the mid portion of the instrument panel closest to the passenger; and the lower airbag chamber rear offset being greater than 25 mm such that the mid portion of the instrument panel causes the rear face of the lower airbag chamber to be distorted to a position closer to the passenger when the airbag is in the actual inflated configuration than if the airbag cushion were in the design configuration.

26. A passenger airbag system for an automotive vehicle having a passenger compartment, a windshield, and an instrument panel disposed between the passenger compartment and the windshield, the instrument panel having a top portion adjacent the windshield with a surface generally facing the windshield and a mid portion further away from the windshield with a surface generally facing a passenger, the passenger airbag system comprising:

an airbag housing having a folded airbag cushion disposed therein when the airbag cushion is in a non-deployed configuration, the airbag cushion being deployable from the airbag housing through the instrument panel, the airbag housing having an upper part and a lower part;

the airbag cushion having an upper airbag chamber and a lower airbag chamber, the upper airbag chamber being a main airbag chamber and having a substantially larger volume than the lower airbag chamber, the lower airbag chamber being a supporting airbag chamber;

the upper airbag chamber having a front face facing the passenger and a lower face directed downwardly, the lower airbag chamber having a front face facing the passenger, a lower face directed downwardly, and a rear face directed toward the mid portion of the instrument panel, the front face of the lower airbag chamber having an upper edge joined to the lower face of the upper airbag chamber at a connection region such that the front face of the lower airbag chamber extends downwardly from the lower face of the upper airbag chamber;

an upper airbag chamber length being defined as a horizontal distance between the portion of the front face of the upper airbag chamber closest to the passenger and the portion of the mid portion of the instrument panel closest to the passenger; and a lower airbag chamber front offset being defined as a horizontal distance between the portion of the front face of the upper airbag chamber closest to the passenger and the connection region where the front face of the lower airbag chamber joins the lower face of the upper airbag chamber, the lower airbag chamber front offset being at least 25% of the upper airbag chamber length; and a tether having a rear end attached to the upper part of the airbag housing and a front end attached at the connection region whereby gas from the airbag housing is encouraged to flow first into the lower airbag chamber and then into the upper airbag chamber; and wherein when the airbag cushion is inflated;

a tension in the tether restraining the connection region resists the lower airbag chamber being bulged toward the passenger at the connection region; and the rear face of the lower airbag chamber pushes against the mid portion of the instrument panel;

whereby the lower airbag chamber generates a torque and a lifting force to the upper airbag chamber.

* * * * *